(12) United States Patent
Mimura

(10) Patent No.: US 6,393,005 B1
(45) Date of Patent: May 21, 2002

(54) METHOD OF CONTROLLING TRANSMITTING POWER OF A BASE STATION IN A CDMA MOBILE COMMUNICATION SYSTEM

(75) Inventor: Yukie Mimura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/095,569

(22) Filed: Jun. 11, 1998

(30) Foreign Application Priority Data

Jun. 27, 1997 (JP) .............................. 9-172072

(51) Int. Cl.[7] .............................................. H04B 7/216
(52) U.S. Cl. ...................... 370/335; 370/342; 455/69; 455/522
(58) Field of Search ................. 370/318, 320, 370/335, 342; 455/63, 69, 38.3, 522

(56) References Cited

U.S. PATENT DOCUMENTS

| | | | | |
|---|---|---|---|---|
| 5,771,451 A | * | 6/1998 | Takai .......................... | 455/442 |
| 5,930,242 A | * | 7/1999 | Mimura ....................... | 370/331 |
| 5,940,743 A | * | 8/1999 | Sunay .......................... | 455/69 |
| 6,088,324 A | * | 7/2000 | Sato ............................ | 370/203 |
| 6,118,983 A | * | 9/2000 | Egusa .......................... | 455/69 |

FOREIGN PATENT DOCUMENTS

| | | |
|---|---|---|
| EP | 0 656 716 | 6/1995 |
| EP | WO 97/09794 | 3/1997 |
| JP | 6-276130 | 9/1994 |
| JP | 7-038496 | 2/1995 |
| JP | 7-046223 | 2/1995 |
| JP | 7-235902 | 9/1995 |
| JP | 8-032513 | 2/1996 |
| JP | 8-037515 | 2/1996 |
| JP | 8-168075 | 6/1996 |
| JP | 8-195712 | 7/1996 |
| JP | 9-36801 | 2/1997 |

OTHER PUBLICATIONS

European Search Report dated Aug. 16, 2001.
Salmasi et al., "On the System Design Aspects of Code Division Multiple Access (CDMA) Applied to Digital Cellular and Personal Communications Networks", IEEE Vehicular Technology Conference, vol. Conf. 41, May 19, 1991, pp. 57–62.
Allen Salmasi, et al., "On the System Design Aspects Of Code Division Multiple Access (CDMA) Applied to Digital Cellular and Personal Communicatins Networks", IEEE VCT 1991 (pp. 57–62).

* cited by examiner

*Primary Examiner*—Alpus H. Hsu
*Assistant Examiner*—Roberta Stevens
(74) *Attorney, Agent, or Firm*—McGinn & Gibb, PLLC (57) ABSTRACT

A method is disclosed for controlling the transmitting power of a base station in a CDMA mobile communication system. The total transmitting power Ptotal of communication channels is calculated and compared with the maximum total transmitting power Pmax. A transmitting power reduction rate $D_{t-1}$ stored at the time of the previous control process is used when calculating maximum total transmitting power Pmax. The proportion of insufficiency of transmitting power is calculated as power reduction rate $D_t$ based on the results of comparison, and this reduction rate $D_t$ is used to reduce the transmitting power of each communication channel.

15 Claims, 8 Drawing Sheets

METHOD OF CONTROLLING TRANSMITTING POWER OF A BASE STATION IN A CDMA MOBILE COMMUNICATION SYSTEM

BACKGROUND OF THE INVENTION

1. Field of the Invention

The present invention relates to a method and a device for controlling the transmitting power of a base station in a mobile communication system based on Code Division Multiple Access (hereinafter abbreviated CDMA).

2. Description of the Related Art

In a CDMA system, transmission is performed by carrying out spread modulation that uses a spread code of high-speed transmission rate after normal information modulation. On the receiving side, normal demodulation is performed after restoring the original information bandwidth by carrying out de-spread modulation that uses the same spread code as the transmitting side. Assignment of an orthogonal spread code sequence to each user allows a plurality of users to communicate simultaneously on the same frequency bandwidth.

In a cellular mobile communication system using CDMA, a plurality of mobile stations share the same frequency band. In communication from a base station to a mobile station, the desired wave signal component and interference wave signal component contained within signals transmitted from the same base station all reach the mobile stations by way of the same propagation path. When a call to mobile station A and a call to mobile station B are made simultaneously from the same base station, for example, mobile station A receives the call to itself as desired wave signal $S_A$ and receives the transmission signal to mobile station B as interference wave signal $S_B$. However, these received signal components $S_A$ and $S_B$ have the same fluctuation characteristics because they have been received by way of the same transmission path from the base station to mobile station A, and as a result, Signal-to-Interference power Ratio (ratio of the received power of the desired wave to the received power of the interference wave hereinbelow abbreviated as "SIR") at the mobile station is constant fixed regardless of the position of the mobile station.

However, when the mobile station receives a desired wave signal from a particular base station X and receives an interference wave signal from another base station Y, the signal component transmitted from base station X and the signal component transmitted from base station Y reach the mobile station by way of different propagation paths. Therefore, the fluctuation characteristics of these signal components also differ, and consequently, a mobile station located near a cell boundary is greatly influenced by the interference wave signal from another base station.

In such cases, degradation of speech quality can be avoided by raising the transmitting power of a base station above the reference power for a mobile station located near a cell boundary. Similarly, degradation in speech quality can also be avoided by increasing the base station transmitting power above the reference power for a mobile station located at a point reached by a plurality of strong multipath signals. On the other hand, the transmitting power of the base station must be reduced below the reference transmitting power for other mobile stations that have good speech quality because the interference wave power received by other mobile stations that are communicating with the base station must be reduced. These factors call for control of the transmitting power of the base station in order to obtain uniform speech quality within a service area.

One example of a method for controlling transmitting power according to the prior art is disclosed in the paper "On the System Design Aspects of Code Division Multiple Access (CDMA) Applied to Digital Cellular and Personal Communication Networks" by A. Salmasi and K. S. Gilhousen and published in IEEE VCT 1991 (pp. 57–62).

Figure 1:
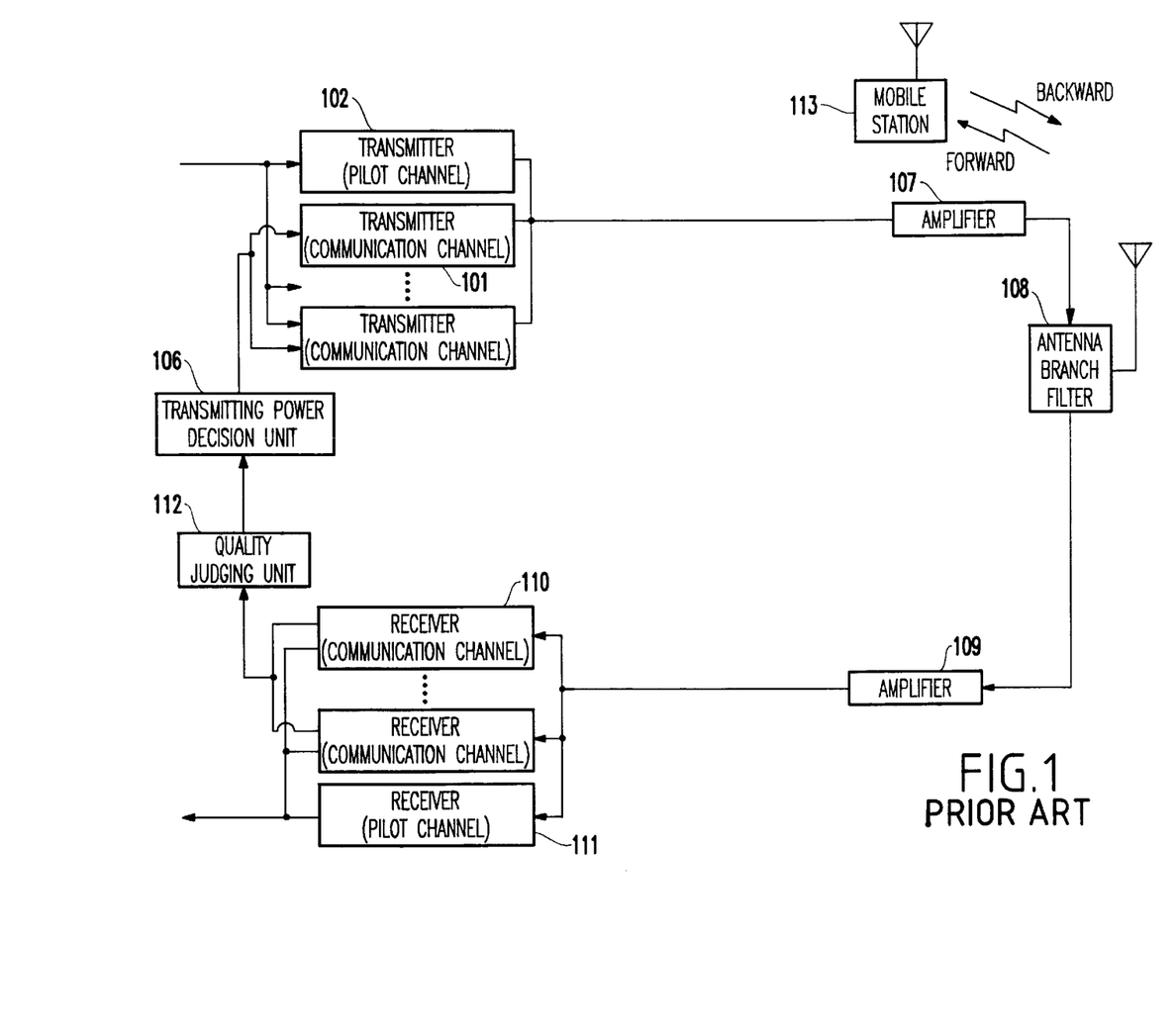
FIG. 1 is a block diagram showing the configuration of a device for controlling transmitting power of a base station according to the prior art.

FIG. 1 shows a schematic representation of a device for controlling the transmitting power of a base station disclosed in the above-described paper. This device comprises a transmitter, a receiver, and antenna branching filter 108. The transmitter consists of a number N of communication channel transmitters 101 for communication channels 1–N, pilot channel transmitter 102, transmitting power decision unit 106, and amplifier 107.

Transmission signals to mobile station 113 (forward transmission signals) are inputted to communication channel transmitters 101 when the signals are speech signals, and to pilot channel transmitter 102 when the signals are pilot signals. After carrying out information modulation and frequency conversion to the radio frequency bandwidth, each individual channel transmitter 101 and 102 spread-modulates the frequency-converted signals using the spread code corresponding to the object mobile station, and outputs the result. The signal generated by adding the output signals of all channels is then outputted to amplifier 107. The signal amplified by amplifier 107 is then transmitted to mobile station 113 by antenna branching filter 108. Communication channel transmitters 101 set the communication channel transmitting power based on information notified from transmitting power decision unit 106 (to be described hereinbelow).

The receiver consists of amplifier 109, a number N of communication channel receivers 110 for communication channels 1–N, pilot channel receiver 111, and quality judging unit 112.

Amplifier 109 amplifies the spread-modulated radio signal received from mobile station 113 by way of antenna and antenna branching filter 108. Communication channel receiver 110 and pilot channel receiver 111 first subject the radio signal amplified by amplifier 109 to de-spread modulation and extract a radio frequency bandwidth signal, and then frequency-convert the radio frequency signal to a baseband signal, generate an analog signal by demodulation, and output the result. In addition, communication channel receivers 110 each decode quality information attached to radio signals received from mobile station 113 (information indicating the quality of signals transmitted to mobile station 113 from the base station, i.e., SIR as measured at mobile station 113), and output to quality judging unit 112. Quality judging unit 112 judges the quality of signals transmitted from the base station to mobile station 113 based on this quality information and notifies transmitting power decision unit 106. Transmitting power decision unit 106 sets the communication channel transmitting power for the mobile station based on the quality notified from quality judging unit 112 and sets each transmitter 101 to this transmitting power.

In a device for controlling transmitting power of a base station according to this configuration, the transmitting power of a base station is controlled based on the SIR measured at a mobile station. When the SIR measured at the mobile station is lower than a reference value, a request signal to increase the transmitting power is transmitted to the base station. When the measured SIR is greater than the reference value, a request signal to decrease the transmitting power is transmitted to the base station. The base station receives these request signals and either increases or decreases the transmitting power by a prescribed control step power, a small value such as 0.5 dB being used as the control step power. Control is limited to a range of, for example, ±6 dB with respect to the reference power.

In a case in which the total transmitting power of the base station increases and approaches a predetermined maximum transmitting power in the device for controlling transmitting power of a base station of the prior art described hereinabove, the base station is unable to increase the power in accordance with the demand of a mobile station despite the transmission of request signals to increase transmitting power from a mobile station because the total transmitting power would then exceed the maximum transmitting power. In the event of insufficient transmitting power in such a case, there is the problem that the waveform of the transmitting signal of the base station is distorted, thereby preventing correct demodulation of the signal at the mobile station and giving rise to degradation of speech quality. Such cases of insufficient base station transmitting power tend to occur at base stations having, for example, increased traffic.

SUMMARY OF THE INVENTION

It is an object of the present invention is to provide a method and device for controlling the transmitting power of a base station in a CDMA cellular system that can reduce degradation in forward speech quality in cases in which the total base station transmitting power increases and the base station is unable to transmit the power desired by mobile stations.

To achieve the above-described object, in the method of controlling the transmitting power of a base station in a CDMA mobile communication system according to the present invention, a desired transmitting power Pa(i) of a transmitting power control object channel i which is one channel selected for transmitting power control from among a plurality of communication channels, is calculated. This desired transmitting power Pa(i) is then added to the transmitting powers Ptx(j) that are currently set to communication channels j, which are communication channels other than this transmitting power control object channel i, and this sum is taken as the total base station transmitting power Ptotal.

The total base station transmitting power Ptotal is then compared with a predetermined maximum total transmitting power Pmax, and when the total base station transmitting power Ptotal is greater than the maximum total transmitting power Pmax, the total base station transmitting power Ptotal is divided by the maximum total transmitting power Pmax to calculate the proportion of insufficient transmitting power and find a power reduction rate $D_t$.

A value obtained by using power reduction rate $D_t$ to reduce the desired transmitting power Pa(i) is then set as the new transmitting power of transmitting power control object channel i, and a value obtained by using power reduction rate $D_t$ to reduce each transmitting power Ptx(j) currently set to each current communication channel j is set as the new transmitting power of each of communication channels j.

The present invention allows the total base station transmitting power Ptotal to be controlled so as not to exceed the maximum total transmitting power Pmax by reducing the transmitting power of each communication channel by this power reduction rate $D_t$.

In addition, in the another method of controlling transmitting power of a base station in a CDMA mobile communication system of the present invention, one channel is selected as the transmitting power control object channel i from among a plurality of communication channels at regular intervals; and, in a transmitting power control process that updates the setting of the transmitting power of each communication channel such that the transmitting power control object channel i satisfies a prescribed speech quality, stores as the previous reduction rate $D_{t-1}$ the power reduction rate of the total transmitting power that was used in the preceding processing.

For communication channels j other than the transmitting power control object channel i, values obtained by multiplying transmitting powers Ptx(j) currently set to each of communication channels as the result of the previous transmitting power control process by the previous reduction rate $D_{t-1}$ is output as the provisional transmitting powers of these communication channels j.

For the transmitting power control object channel i, when the value obtained by multiplying the desired transmitting power Pa(i) by a prescribed function of the previous reduction rate $D_{t-1}$ is equal to or less than a specified maximum transmitting power per channel Pmax–1ch, that power is made to be the provisional transmitting power of that channel i; when the value obtained by multiplying the desired transmitting power Pa(i) by a prescribed function of the previous reduction rate $D_{t-1}$ is greater than the specified maximum transmitting power per channel Pmax–1ch, a value obtained by dividing the maximum transmitting power per channel Pmax–1ch by the prescribed function is made to be the provisional transmitting power of that channel i.

The total base station transmitting power Ptotal is then calculated by adding the provisional transmitting power of each communication channel, and the power reduction rate $D_t$, which is the proportion by which the total transmitting power of the base station is reduced, is calculated by dividing this total base station transmitting power Ptotal by the specified maximum total transmitting power Pmax.

When the total base station transmitting power Ptotal is greater than the maximum total transmitting power Pmax, the provisional transmitting power of each communication channel is divided by power reduction rate $D_t$, and this divided transmitting power is set as the new transmitting power of each communication channel. When the total base station transmitting power Ptotal is equal to or less than the maximum total transmitting power Pmax, each provisional transmitting power is divided by the previous reduction rate $D_{t-1}$, and this divided transmitting power is set to each communication channel as the new transmitting power of each communication channel.

In the method of controlling the transmitting power of a base station of the present invention, the transmitting power of each individual communication channel that has been reduced by the previous transmitting power control process are returned to the transmitting power before reduction by multiplying by a prescribed function of the previous reduction rate $D_{t-1}$ for transmitting power control object channel i and multiplying by previous reduction rate $D_{t-1}$ for communication channels j; then these transmitting powers are made the provisional transmitting powers; and these provisional transmitting powers are used to effect control of transmitting power.

Accordingly, control is effected whereby the transmitting power of each communication channel is returned to its original value when the total base station transmitting power Ptotal no longer exceeds the maximum total transmitting power Pmax.

In addition, according to another method of controlling the transmitting power of a base station in a CDMA mobile communication system of the present invention, the prescribed function of the previous reduction rate $D_{t-1}$ is a function by which the previous reduction rate $D_{t-1}$ is raised to the α power.

In the another method of controlling the transmitting power of a base station in a CDMA mobile communication system according to the present invention, the desired transmitting power Pa(i) of transmitting power control object channel i, is calculated which is one channel selected for transmitting power control from among a plurality of communication channels.

The total base station transmitting power Ptotal is then calculated by adding the desired transmitting power Pa(i) and transmitting power Ptx(j) currently set to communication channels j, which are communication channels other than transmitting power control object channel i.

Power conversion rate $C_t$ is then found by dividing the total base station transmitting power Ptotal by the maximum total transmitting power Pmax.

A value obtained by using power conversion rate $C_t$ to convert desired transmitting power Pa(i) is then set as the new transmitting power of transmitting power control object channel i, and values obtained by using power conversion rate $C_t$ to convert the transmitting power Ptx(j) currently set to each of communication channels j are set as the new transmitting powers of communication channels j.

In this method of controlling transmitting power of a base station of the present invention, the value of the total base station transmitting power Ptotal is always equal to the maximum total transmitting power Pmax by multiplying the set transmitting power by the power conversion rate.

Accordingly, the amount of interference from the base station no longer depends on the volume of traffic because the total base station transmitting power Ptotal is always constant, and the design of a base station device is accordingly simplified.

As described hereinabove, the present invention has the effect of preventing the total transmitting power of a base station from exceeding the maximum transmitting power by calculating the total transmitting power when the desired transmitting power of each channel is being transmitted and then reducing the transmitting power when this total transmitting power is equal to or greater than the maximum total transmitting power of the base station.

The above and other objects, features, and advantages of the present invention will become apparent from the following description with references to the accompanying drawings which illustrate examples of the present invention.

DETAILED DESCRIPTION OF THE PREFERRED EMBODIMENTS (First Embodiment)

Explanation is first presented with reference to the accompanying drawings regarding the method of controlling transmitting power of a base station in a CDMA mobile communication system according to the first embodiment of the present invention. Constituent elements that are equivalent to those shown in FIG. 1 are identified by the same reference numerals.

Figure 2:
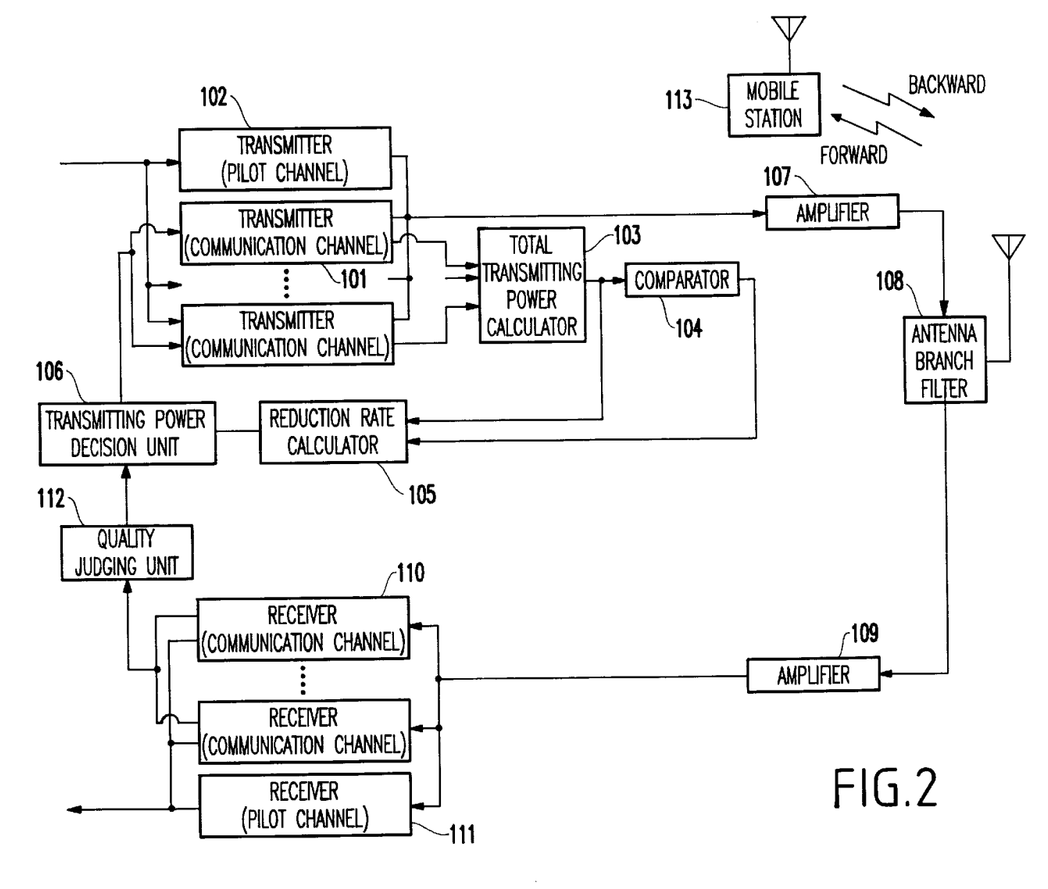
FIG. 2 is a block diagram showing the configuration of a device for controlling transmitting power of a base station according to the first embodiment of the present invention.

The transmitting power control device of this embodiment comprises a transmitter, a receiver, and antenna branching filter 108.

The transmitter comprises a plurality of communication channel transmitters 101, pilot channel transmitter 102, total transmitting power calculator 103, comparator 104, reduction rate calculator 105, transmitting power decision unit 106, and amplifier 107. The receiver includes amplifier 109, a plurality of communication channel receivers 110, pilot channel receiver 111, and quality judging unit 112. The transmitter and receiver can communicate with a plurality of mobile stations 113 by way of antenna branching filter 108 and an antenna.

The points of difference between the device for controlling transmitting power of a base station of this embodiment and the prior-art device for controlling transmitting power of a base station in FIG. 1 are the provision of total transmitting power calculator 103, comparator 104, and reduction rate calculator 105, and the determination of transmitting power of communication channel transmitters 101 by transmitting power decision unit 106 based on the judgment results of quality judging unit 112 and the output of reduction rate calculator 105.

Total transmitting power calculator 103 calculates the total transmitting power of communication channels 1–N. Comparator 104 compares the total transmitting power calculated at total transmitting power calculator 103 with a predetermined prescribed value to determine whether or not the base station transmitting power is sufficient (whether or not the total transmitting power is greater than the prescribed value). If it is determined at comparator 104 that the base station transmitting power is insufficient, reduction rate calculator 105 calculates the reduction rate, which is the proportion by which the transmitting power is reduced. Transmitting power decision unit 106 determines the transmitting power using the power reduction rate calculated by reduction rate calculator 105 and resets the transmitting power at all communication channel transmitters 101.

Explanation is next presented regarding the operation of the device for controlling transmitting power of a base station in a CDMA mobile communication system according to the present embodiment.

Of the forward transmission signals, communication signals are outputted to communication channel transmitters 101 and pilot signals are outputted to pilot channel transmitter 102. At communication channel transmitters 101, the transmitting powers are set based on the information notified from transmitting power decision unit 106. Modulation of analog signals, frequency-conversion to a radio frequency bandwidth, and spread-modulation are carried out at each of the channel transmitters 101 and 102, and a signal produced by adding all channel signals is outputted to amplifier 107. The signal amplified at amplifier 107 is transmitted to mobile stations 113 by way of antenna branching filter 108.

Information regarding the transmitting power set at each communication channel transmitter 101 is outputted to total transmitting power calculator 103. Total transmitting power calculator 103 calculates the total transmitting power of communication channels 1–N, following which the total transmitting power calculation result that has been calculated at total transmitting power calculator 103 is outputted to comparator 104. Comparator 104 compares the total transmitting power with a maximum total transmitting power of the base station that has been specified in advance, and notifies the comparison result to reduction rate calculator 105. Based on the comparison result from comparator 104, reduction rate calculator 105 calculates the power reduction rate from the total transmitting power calculated at total transmitting power calculator 103 and the maximum total transmitting power of the base station that has been specified in advance. This power reduction rate is then notified to transmitting power decision unit 106.

On the other hand, signals received from mobile stations 113 by way of antenna branching filter 108 and amplifier 109 are outputted to each channel receiver 110 and 111, and de-spread modulation, frequency-conversion to baseband signals, and demodulation are carried out. At quality judging unit 112, quality information of forward communication channels is extracted from signals that have been demodulated at each of receivers 110, and the results are notified to transmitting power decision unit 106. Transmitting power decision unit 106 calculates the transmitting power using the power reduction rate notified from reduction rate calculator 105 together with quality information notified from quality-judging unit 112, and notifies each communication channel transmitter 101. The transmitting power can be varied up and down at communication channel transmitters 101 based on the information notified from transmitting power decision unit 106.

Figure 3:
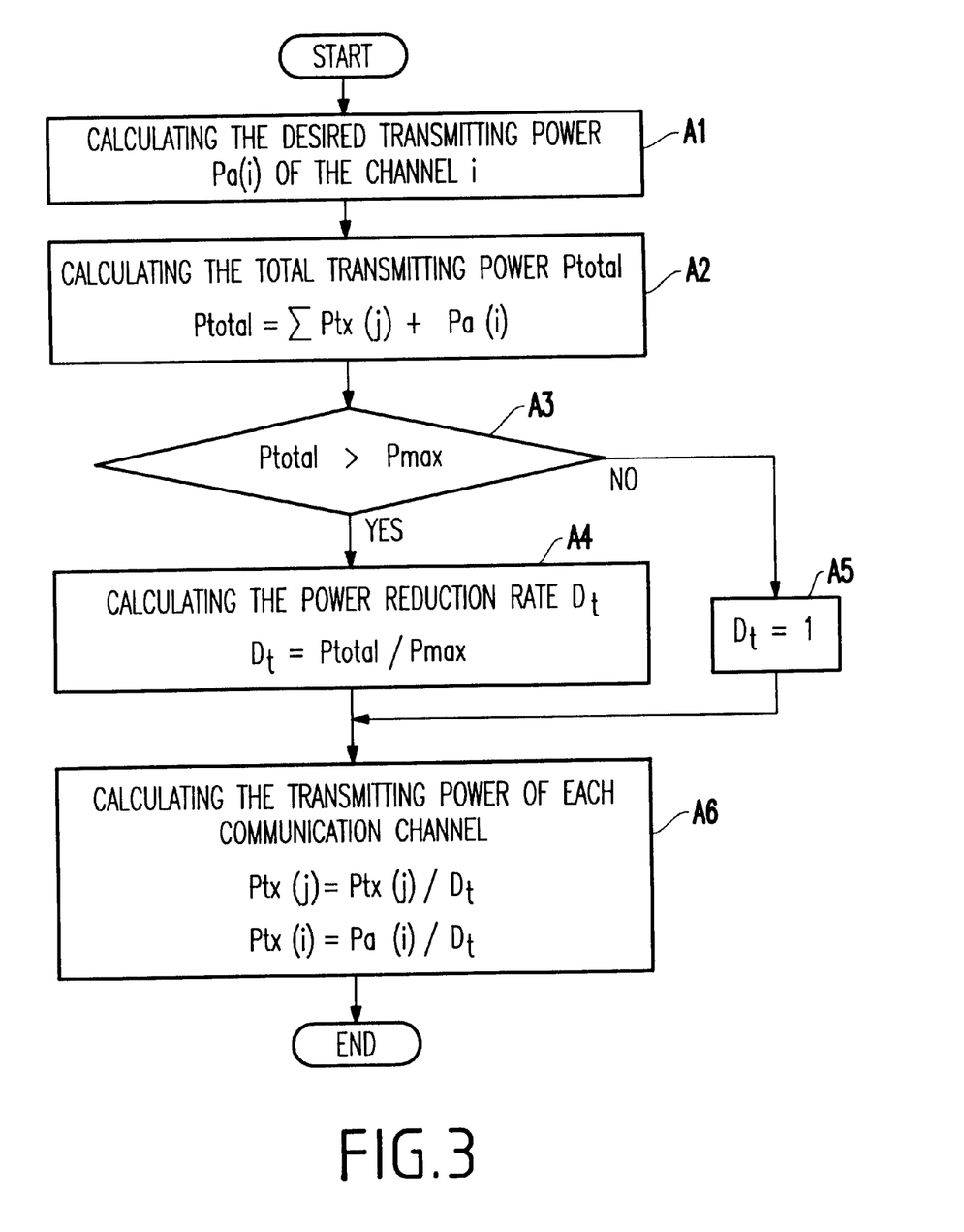
FIG. 3 is a flow chart illustrating the operation of the device for controlling transmitting power of a base station in FIG. 2.

The operating procedures of the first embodiment of the present invention are next explained with reference to FIG. 3.

In transmitting power decision unit 106 of the base station, one communication channel of communication channels 1–N is selected at fixed intervals, and the desired transmitting power Pa(i) of this communication channel i is determined (Step A1). This desired transmitting power is determined such that the speech quality of the forward communication channel as determined by quality judging unit 112 satisfies a predetermined target speech quality. The procedures of this embodiment shown in FIG. 3 are procedures for resetting transmitting powers that determine the desired transmitting power Pa(i) of communication channel i at fixed-interval times t. The transmitting power Ptx(j) of each communication channel j other than channel i is notified to total transmitting power calculator 103. The desired transmitting power Pa(i) for communication channel i is notified. Total transmitting power calculator 103 adds these notified transmitting powers and calculates the total transmitting power Ptotal (Step A2). The total transmitting power Ptotal is then compared with a preset maximum total transmitting power Pmax of the communication channels of the base station at comparator 104 (Step A3). When the result of comparison satisfies equation (1) the following, i.e., when the transmitting power of communication channel i cannot be set to the desired transmitting power Pa(i) because the transmitting power of the base station is insufficient, reduction rate calculator 105 calculates the reduction rate, which is the proportion of transmitting power insufficiency.

$$P\text{total} > P\text{max} \tag{1}$$

Reducing the transmitting power of all communication channels by this proportion of power insufficiency enables the total transmitting power to be controlled to at or below the maximum value while maintaining the Signal-to-Interference power Ratio received at mobile stations 113 at a uniform level. The transmitting power reduction rate $D_t$ can be found by the following equation (2) (Step A4):

$$D_t = P\text{total}/P\text{max} \tag{2}$$

In addition, in a case in which the transmitting power of the base station satisfies the following equation (3), the power reduction rate $D_t$ becomes 1 and the transmitting power is not reduced (Step A5).

$$P\text{total} < P\text{max} \tag{3}$$

The power reduction rate $D_t$ calculated at reduction rate calculator 105 is notified to transmitting power decision unit 106. Transmitting power decision unit 106 calculates the transmitting power of each communication channel (Step A6). As shown in the following equation (4), the transmitting power Ptx(i) of communication channel i is determined to be a value obtained by dividing the desired transmitting power Pa(i) by power reduction rate $D_t$.

$$Ptx(i) = Pa(i)/D_t \tag{4}$$

If j represents all communication channels other than communication channel i, the transmitting power Ptx(j) of communication channels j is determined to be a value obtained by dividing transmitting power Ptx(j) by power reduction rate $D_t$ as shown in the following equation (5):

$$Ptx(j) = Ptx(j)D_t \tag{5}$$

The setting of transmitting power at each communication channel transmitter 101 is updated to the value determined by transmitting power decision unit 106.

With the above-described procedures, the transmitting power of all communication channels can be reduced equally at a uniform ratio equal to the proportion of transmitting power insufficiency, thereby allowing a reduction in the degradation of speech quality of the forward transmission signal transmitted from a base station having insufficient power.

Explanation of the operation of this embodiment is next presented using values from an actual example.

Figure 4:
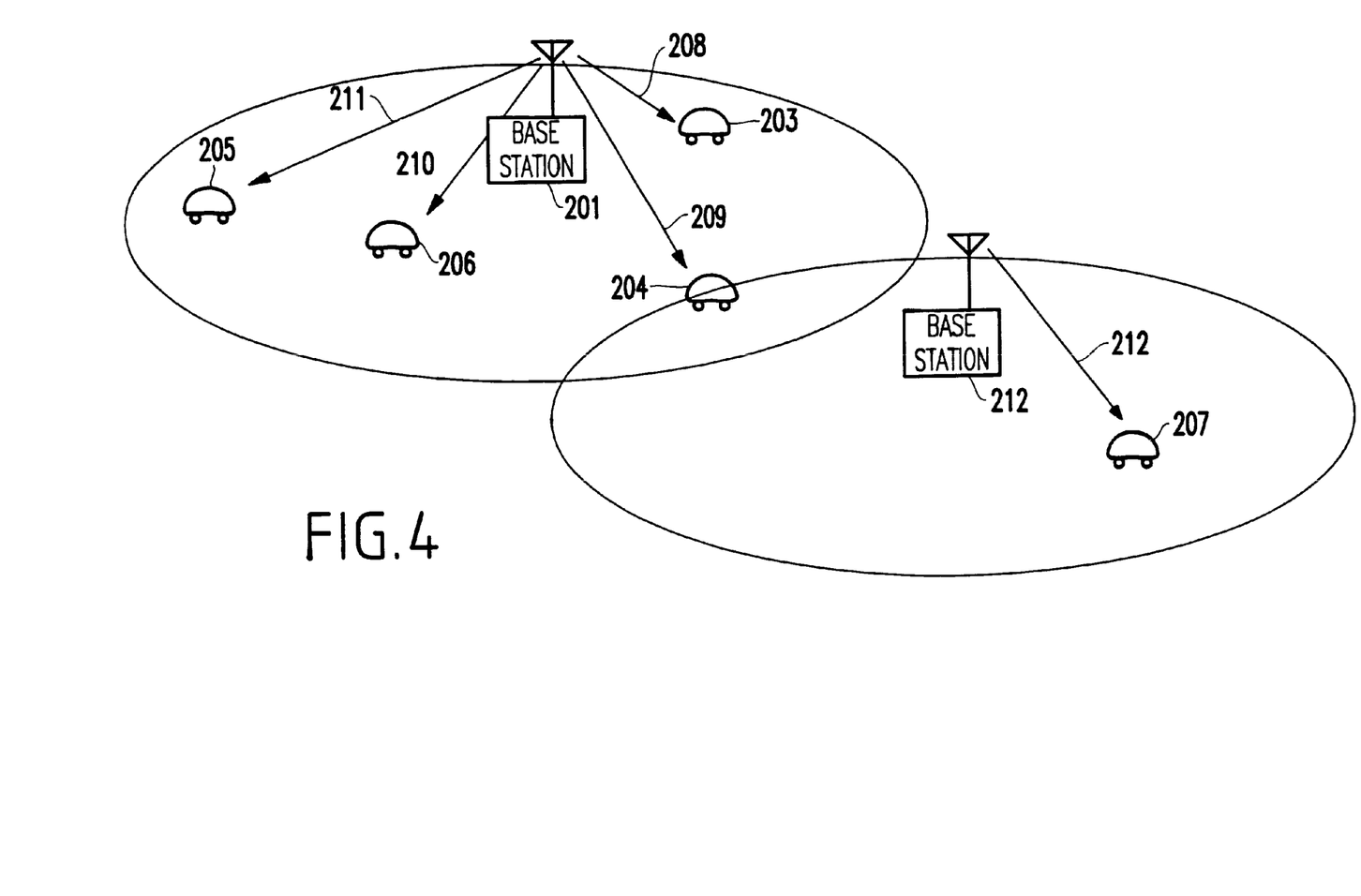
FIG. 4 is a figure showing system configuration for explaining the operation of the device for controlling transmitting power of a base station in FIG. 2.

FIG. 4 shows one example of the arrangement of base stations and mobile stations. Referring to FIG. 4, the CDMA mobile communication system of this embodiment comprises base stations 201 and 202 and mobile stations 203, 204, 205, 206, and 207. Base station 201 is connected to mobile stations 203, 204, 205, and 206, and it is assumed that base station 201 is communicating with each of the mobile stations using communication channels 208, 209, 210, and 211. Base station 202 is connected with mobile station 207 and communicating with this mobile station using communication channel 212.

Explanation is presented regarding a case in which the desired transmitting power Pa(i) of communication channel 208 is set at the regularly spaced time points at which transmitting power control is effected.

The transmitting power of communication channels 208–211 immediately preceding transmitting power control of communication channel 208 are the values shown in Table 1 below, and the maximum total communication channel transmitting power of base station 201 is 100.0 mw.

TABLE 1

| channel number k | transmitting power Ptx(k) mw |
|---|---|
| 208 | 10.00 |
| 209 | 35.00 |
| 210 | 40.00 |
| 211 | 13.00 |

TABLE 2

| channel number k | transmitting power Ptx(k) mw |
|---|---|
| 208 | 20.00 |
| 209 | 31.82 |
| 210 | 36.26 |
| 211 | 11.82 |

In this case, when the desired transmitting power such that communication channel 208 satisfies the target speech quality is 22.0 mw (FIG. 3, Step A1), the total transmitting power of communication channels obtained at total transmitting power calculator 103 is then 110.0 mw (Step A2), and the total transmitting power therefore exceeds the maximum total transmitting power of 100.0 mw of base station 201 (Step A3). The power reduction rate is calculated at reduction rate calculator 105 (Step A4), and it is found that the power reduction rate $D_r$=110/100=1.1. The new transmitting power of each communication channel that is reset at transmitting power decision unit 106 is shown in Table 2 (Step A6).

This embodiment calculates the total base station transmitting power Ptotal on the assumption that the desired transmitting power Pa(i) is set as the transmitting power of transmitting power control object channel i, and then reduces the transmitting power of all communication channels by a fixed proportion using power reduction rate $D_r$ if this value exceeds the maximum total transmitting power Pmax, thereby preventing the transmitting power of the base station from exceeding the maximum total transmitting power Pmax.

In this embodiment, moreover, although the transmitting power set for transmitting power control object channel i is a value lower than the desired transmitting power Pa(i), the amount of interference from within the same cell is also reduced because the transmitting power for other communication channels is reduced by the same proportion. Therefore, degradation of the Signal-to-Interference power Ratio (SIR) is not significant.

(Second Embodiment)

Explanation is next presented regarding the second embodiment of the present invention with reference to the accompanying drawings.

Figure 5:
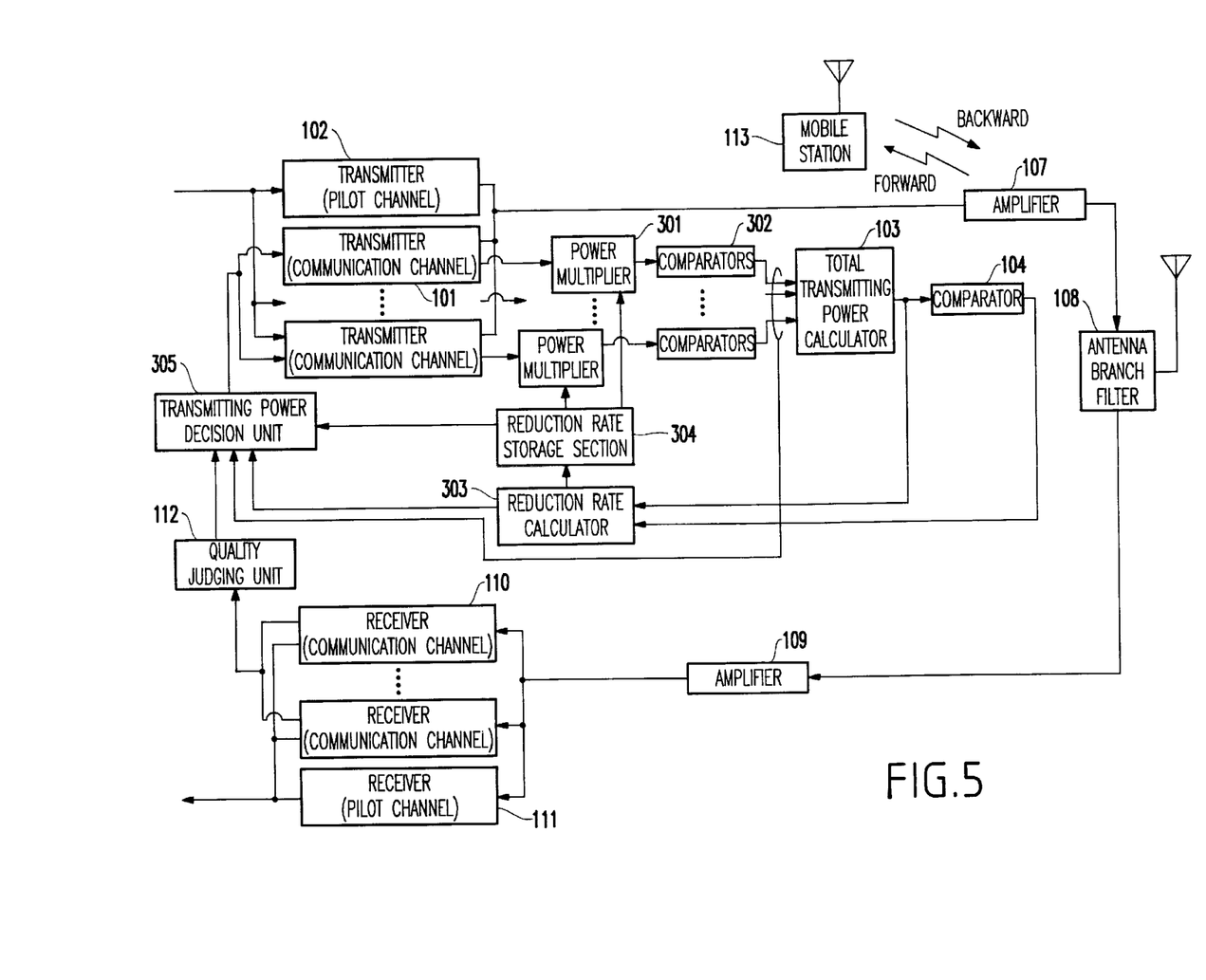
FIG. 5 is a block diagram showing the configuration of a device for controlling transmitting power of a base station according to the second embodiment of the present invention.

FIG. 5 is a block diagram of the second embodiment of the present invention. The points of difference of the device for controlling transmitting power of a base station in FIG. 5 with respect to the first embodiment shown in FIG. 2 are the addition of a plurality of power multipliers 301 provided for each of communication channels 1–N, comparators 302 respectively connected to each of power multipliers 301, reduction rate calculator 303, and reduction rate storage unit 304; and the replacement of transmitting power decision unit 106 with transmitting power decision unit 305. Transmitting power decision unit 305 differs with respect to transmitting power decision unit 106 in that transmitting power is determined based on the output of quality judging unit 112, reduction rate calculator 303, reduction rate storage unit 304, and comparator 302.

In this embodiment, reduction rate storage unit 304 is provided for storing the power reduction rate calculated by reduction rate calculator 303 for use in calculating the next power reduction rate of communication channels.

Power multipliers 301 receive information of the transmitting power set at communication channel transmitters 101 and multiply these values by the previous power reduction rate notified from reduction rate storage unit 304. The multiplied power is outputted to comparators 302. Comparators 302 compare the multiplied power with the preset maximum transmitting power per communication channel. The powers outputted from each comparator 302 for communication channels are added at total transmitting power calculator 103 to calculate the total transmitting power.

Comparator 104 compares this total transmitting power with the preset maximum transmitting power of the base station, and the results of comparison are notified to reduction rate calculator 303. Reduction rate calculator 303 calculates the power reduction rate of the communication channels, and this power reduction rate is notified to transmitting power decision unit 305 and reduction rate storage unit 304. Transmitting power decision unit 305 calculates the transmitting power using the power reduction rate notified from reduction rate calculator 303 together with the quality information notified from quality judging unit 112, the previous power reduction rate notified from reduction rate storage unit 304, and the power outputted from comparator 302, and notifies each communication channel transmitter 101.

Figure 6:
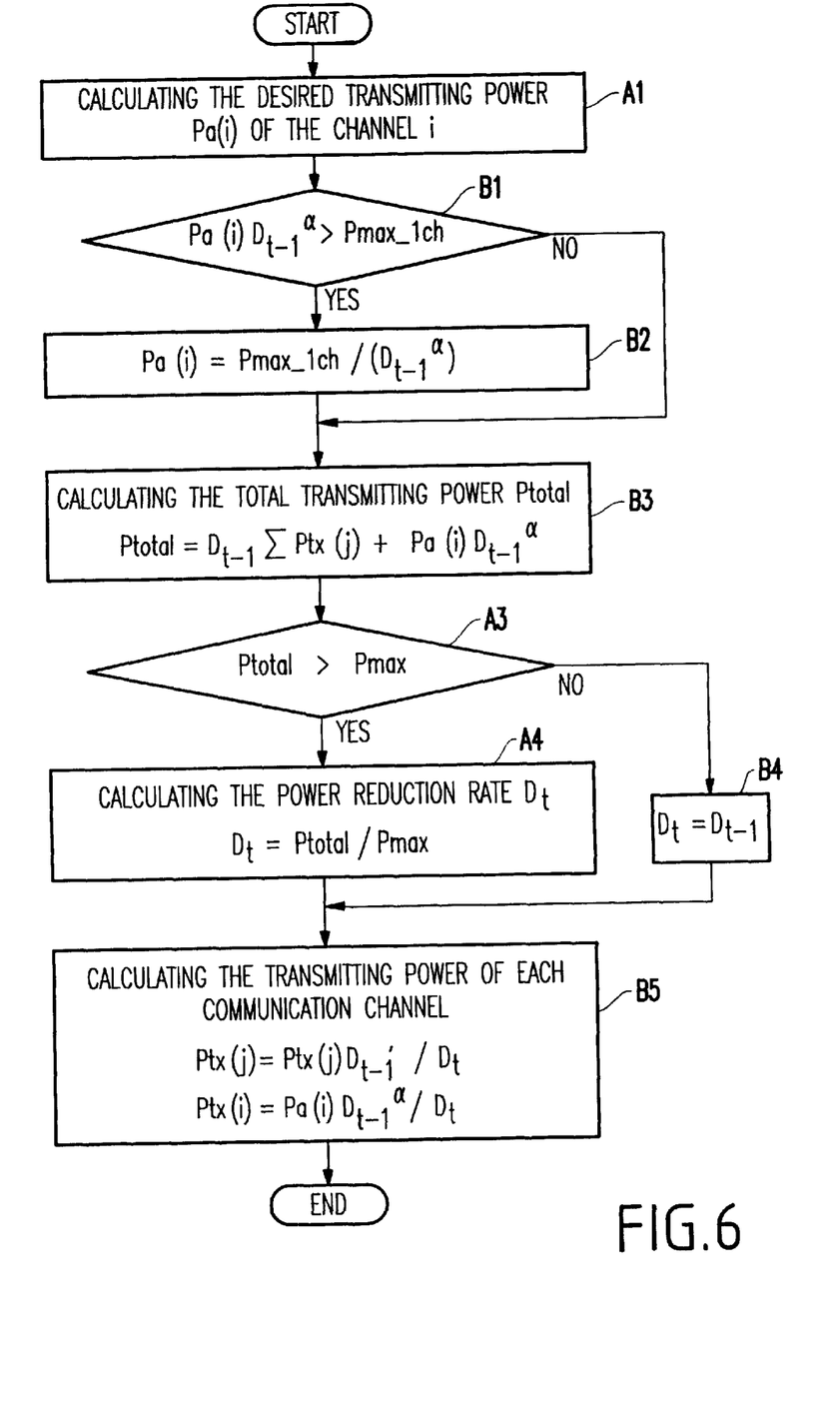
FIG. 6 is a flow chart illustrating the operation of the device for controlling transmitting power of a base station in FIG. 5.

Explanation is next presented regarding the operating procedures of this embodiment with reference to FIG. 6.

Transmitting power decision unit 305 of the base station determines the desired transmitting power Pa(i) of the communication channels at regular intervals (Step A1). This desired transmitting power Pa(i) is calculated as the power that meets a preset target speech quality of the forward communication channel based on the speech quality of the communication channel as judged by quality judging unit 112.

The operating procedures shown in FIG. 6 are transmitting power control procedures that determine the desired transmitting power Pa(i) of communication channel i at regularly spaced times t.

Each communication channel transmitter 101 notifies information regarding the transmitting power to a respective power multiplier 301. Power multiplier 301 multiplies transmitting power at the current time t Pt notified from each transmitter 101 by the reduction rate $D_{t-1}$ calculated at time t−1 and notified from reduction rate storage unit 304. In this case, time t−1 is the time when the transmitting power control process was previously carried out. The process of multiplying transmitting power Pt by previous reduction rate $D_{t-1}$ is carried out in separate procedures for communication channel i and communication channel j (j representing any communication channel other than i).

As shown in the following equation (6), for communication channel i, desired transmitting power Pa(i) is multiplied by the α power of previous reduction rate $D_{t-1}$, i.e., $D_{t-1}^{\alpha}$, at power multiplier 301 for communication channel i.

$$Pa(i) \times D_{t-1}^{\alpha} \tag{6}$$

Where α is a value within the range $0 \leq \alpha \leq 1$, whereby $D_{t-1}^{\alpha}$ becomes 1 when α is 0, and $D_{t-1}^{\alpha}$ becomes $D_{t-1}$ when α is 1. $D_{t-1}^{\alpha}$ is therefore a value within the range $1 \leq D_{t-1}^{\alpha} \leq D_{t-1}$.

At comparator 302 for communication channel i, the calculation result of power multiplier 301 is compared with the maximum transmitting power per channel Pmax–1ch (Step B1). When the calculation result of power multiplier 301 is greater, comparator 302 for communication channel i alters desired transmitting power Pa(i) to the value shown by the following equation (7) (Step B2):

$$Pa(i) = P\max-1ch / D_{t-1}^{\alpha} \tag{7}$$

Comparator 302 for communication channel i then outputs a value obtained by multiplying this Pa(i) by $D_{t-1}^{\alpha}$ to total transmitting power calculator 103 as the provisional transmitting power. When the calculation result of power multiplier 301 is smaller, comparator 302 for communication channel i outputs to total transmitting power calculator 103 the calculation result of power multiplier 301 for communication channel i, i.e., $Pa(i) \times D_{t-1}^{\alpha}$, as the provisional transmitting power without alteration.

As for a communication channel j, power multiplier 301 for communication channels j multiplies Ptx(j), which is the transmitting power of communication channel j, by the previous reduction rate $D_{t-1}$ as shown in the following equation (8), and makes this the provisional transmitting power:

$$Ptx(j) \times D_{t-1} \tag{8}$$

Comparators 302 for communication channels j output the power calculated by power multipliers 301 without alteration to total transmitting power calculator 103 as the provisional transmitting power.

Total transmitting power calculator 103 calculates the total transmitting power Ptotal by summing up the provisional transmitting power of all communication channels (Step B3), and total transmitting power Ptotal is compared with the preset base station communication channel maximum total transmitting power Pmax at comparator 104 (Step A3). When the results of comparison at comparator 104 accord with the relation shown by the following equation (9), i.e., when the transmitting power of the base station is insufficient, transmitting power reduction rate $D_t$, which is the ratio of power insufficiency, is calculated at reduction rate calculator 303 (Step A4). The equation for calculating the transmitting power reduction rate $D_t$ of the communication channels is shown in equation (10).

$$P\text{total} > P\max \tag{9}$$

$$D_t = P\text{total}/P\max \tag{10}$$

In addition, when the results of comparison at comparator 104 accord with the relation shown in the following equation (11), i.e., when the transmitting power of the base station is sufficient, power reduction rate $D_t$ is replaced by the power reduction rate $D_{t-1}$ at the previous time point t–1 as shown in equation (12) (Step B4).

$$P\text{total} < P\max \tag{11}$$

$$D_t = D_{t-1} \tag{12}$$

The power reduction rate calculated at reduction rate calculator 303 is then stored in reduction rate storage unit 304. Transmitting power decision unit 106 calculates the transmitting power of each communication channel (Step A6). The transmitting power Ptx(i) of communication channel i is found from a value obtained by first multiplying desired transmitting power Pa(i) by the power reduction rate $D_{t-1}$ of the previous time point t–1 raised to the a power and then dividing the result by power reduction rate $D_t$, as shown in the following equation (13):

$$Ptx(i) = Pa(i) \times D_{t-1}^{\alpha}/D_t \tag{13}$$

The transmitting power Ptx(j) of communication channel j is found by first multiplying transmitting power Ptx(j) by the power reduction rate $D_{t-1}$ at the previous time point t–1 and then dividing the result by power reduction rate $D_t$, as shown in the following equation (14) (Step B5).

$$Ptx(j) \times D_{t-1}/D_t \tag{14}$$

The feature of this embodiment is the use of the power reduction rate $D_{t-1}$ of the preceding time t–1 in the calculation of the power reduction rate $D_t$ at time t. In the first embodiment described hereinabove, the transmitting power of a communication channel j, which is a channel other than the communication channel that is the object of the calculation of desired transmitting power, is reduced repeatedly each time there is insufficiency in the base station transmitting power, and the transmitting power is not returned to the original level even when the total base station transmitting power Ptotal does not exceed the maximum Pmax. The reduction of the transmitting power of communication channel j thus continues until that communication channel becomes the object of the desired transmitting power calculation (Step A1), the transmitting power thus reaching a minimum immediately before that channel becomes the object channel.

As an example, the transmitting power of communication channel i is at a minimum after being subjected to control at the preceding time point t–1. This phenomenon tends to occur with the lengthening period of the fixed intervals of calculation of desired transmitting power of each communication channel based on speech quality, i.e., the period of transmitting power control. In this embodiment, however, the use of a value obtained by multiplying the transmitting power Ptx(j) of communication channel j by the power reduction rate $D_{t-1}$ at previous time point t–1 in the calculation of the desired transmitting power enables control in which the transmitting power of each communication channel is returned to the original transmitting power before reduction when the total base station transmitting power Ptotal is reduced to less than at the preceding time point t–1.

However, using a value obtained by multiplying the previous power reduction rate $D_{t-1}$ by the transmitting power Ptx(j), results in a calculation for communication channel i using a value in which the interference wave power is increased, and as a result, the desired transmitting power Pa(i) of communication channel i must be increased by the proportion of increase of the interference wave power. $D_t$ is calculated for communication channel i by multiplying desired transmitting power Pa(i) by $D_{t-1}^{\alpha}$. Coefficient α is not limited to a fixed value but is a value that can be varied to adapt to the environment or the amount of traffic at the time of service.

Explanation is next presented regarding the operation of this embodiment using values from an actual example. In this explanation as well, reference is made to FIG. 4, which was also used for the first embodiment.

A case will be used for explanation in which the desired transmitting power Pa(i) of communication channel 208 is determined at a time point at which regularly spaced transmitting power control is carried out.

It is assumed, the transmitting powers of each of communication channels 208–211 immediately preceding the transmitting power control of communication channel 208 are the values shown in the following Table 3, the maximum total communication channel transmitting power of base station 201 being 100.0 mw, and the maximum transmitting power per communication channel is 50.0 mw, and coefficient a is 0.5. In addition, the power reduction rate $D_{t-1}$ at the previous time t-1 is assumed to be 1.20.

TABLE 3

| channel number k | transmitting power Ptx(k) mw |
|---|---|
| 208 | 20.00 |
| 209 | 30.00 |
| 210 | 40.00 |
| 211 | 10.00 |

TABLE 4

| channel number k | transmitting power Ptx(k) mw |
|---|---|
| 208 | 14.61 |
| 209 | 32.02 |
| 210 | 42.70 |
| 211 | 10.67 |

The desired transmitting power that allows communication channel 208 to meet the target quality is assumed to be 15.0 mw (Step A1). Since the value 16.4 mw obtained by multiplying the desired transmitting power by power reduction rate 1.20 of the preceding time point raised to the α power is smaller than the maximum transmitting power per channel of 50 mw (Step B1), the total communication channel transmitting power of base station 201 is next calculated (Step B3). The total communication channel transmitting power obtained at total transmitting power calculator 103 is 112.43 mw, which exceeds the maximum total transmitting power of base station 201, i.e., 100.0 mw (Step A3). The reduction rate calculator 303 then calculates the power reduction rate $D_t$ (Step A4) and obtains a power reduction rate of 1.12. The new transmitting powers of each communication channel reset by transmitting power decision unit 305 become the values shown in Table 4 (Step B5).

As in the first embodiment described hereinabove, this embodiment prevents the transmitting power of the base station from exceeding the maximum total transmitting power Pmax by reducing the transmitting power of all communication channels by a uniform rate using power reduction rate $D_t$. In addition, this embodiment performs transmitting power control by multiplying the transmitting power of the transmitting power control object channel i by previous power reduction rate $D_{t-1}$ raised to the α power and multiplying the transmitting power of communication channels j by the previous reduction rate $D_{t-1}$, thereby returning the transmitting power of each individual communication channel that has been reduced by the preceding transmitting power control to the value before the reduction, making these values the provisional transmitting powers, and then using these provisional transmitting powers. This embodiment therefore effects control by returning the transmitting power of each communication channel to its original value in cases in which the total base station transmitting power Ptotal does not exceed the maximum total transmitting power Pmax.

(Third Embodiment)

Figure 7:
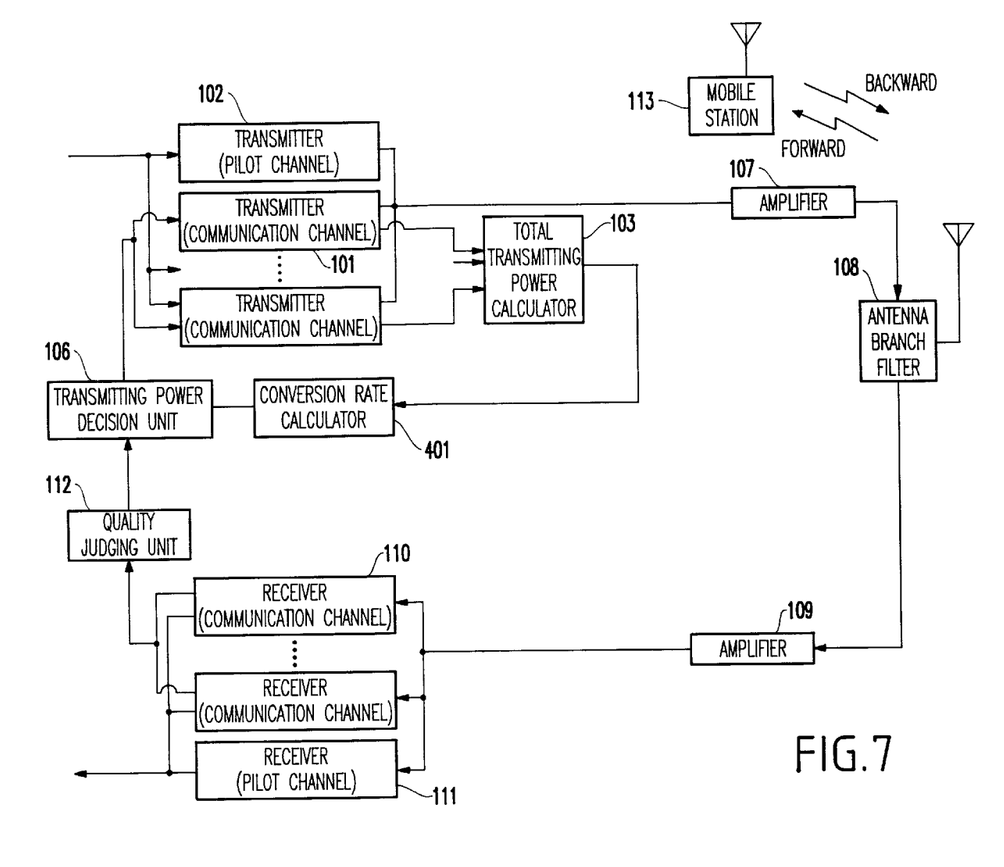
FIG. 7 is a block diagram showing the configuration of a device for controlling transmitting power of a base station according to the third embodiment of the present invention.

Explanation is next presented regarding the third embodiment of the present invention with reference to the accompanying drawings. FIG. 7 is a block diagram showing the device for controlling transmitting power of a base station according to the third embodiment of the present invention. Constituent elements equivalent to those of FIG. 2 are identified by the same reference numerals.

The differences between the transmitting power control device of this embodiment and the transmitting power control device according to the first embodiment shown in FIG. 2 include the elimination of comparator 104 and the replacement of reduction rate calculator 105 by conversion rate calculator 401.

Total transmitting power calculator 103 calculates the total transmitting power Ptotal of the communication channels and outputs the result of this calculation to conversion rate calculator 401. Conversion rate calculator 401 calculates the power conversion rate $C_t$ of the communication channels and notifies the calculated power conversion rate $C_t$ to transmitting power decision unit 106.

Figure 8:
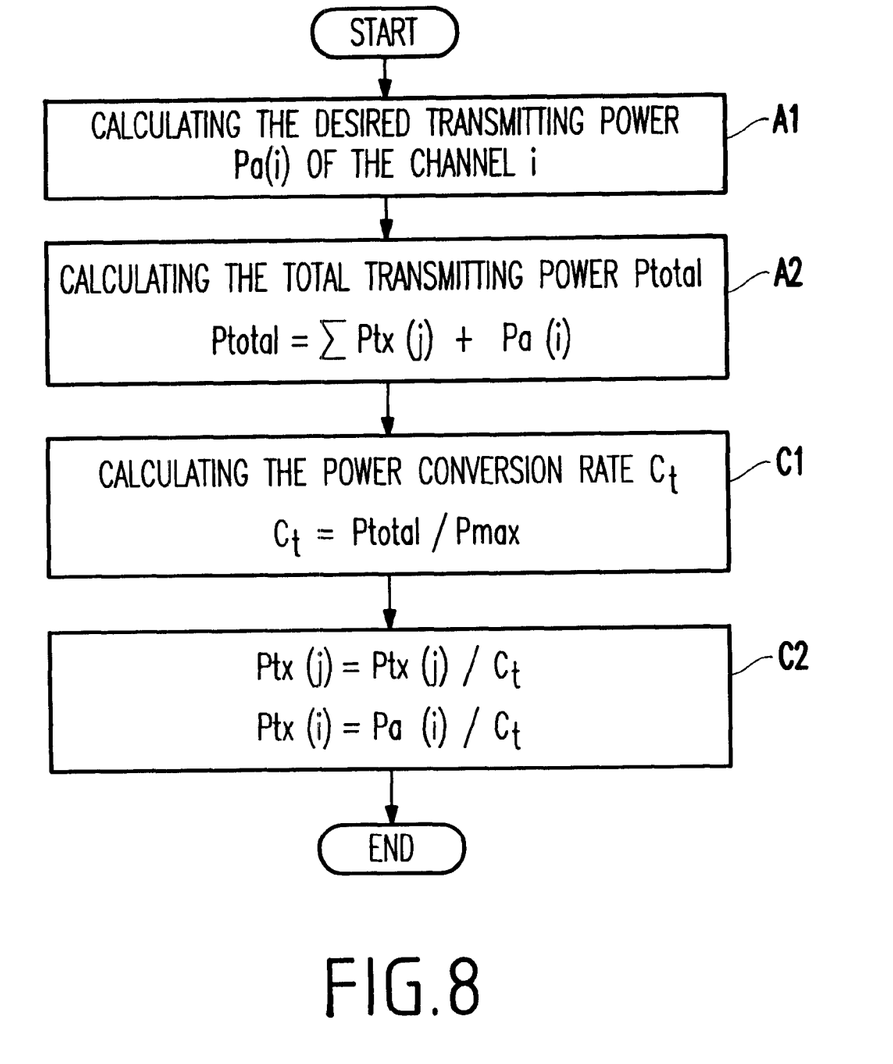
FIG. 8 is a flow chart illustrating the operation of the device for controlling transmitting power of a base station in FIG. 7.

The operating procedures of this embodiment are next explained with reference to FIG. 8.

The procedures of this embodiment are equivalent to those of the first embodiment from the determination of the desired transmitting power Pa(i) of communication channel i by transmitting power decision unit 106 at regularly spaced times t (Step A1) and up to the addition of each of the transmitting powers notified from transmitter 102 for each communication channel at total transmitting power calculator 103 to obtain the calculation of the total transmitting power Ptotal (Step A2). This calculated total transmitting power Ptotal is next notified to conversion rate calculator 401. The feature of the third embodiment is that conversion rate calculator 401 calculates power conversion rate $C_t$ such that the transmitting power Ptotal always equals the communication channel maximum total transmitting power Pmax of the base station. In other words, power conversion rate $C_t$ is obtained by the case of the following equation (15) (Step C1):

$$C_t = Ptotal/Pmax \tag{15}$$

Power conversion rate $C_t$ becomes a value greater than or equal to 1 when the total transmitting power Ptotal is greater than the maximum total transmitting power Pmax, and power conversion rate $C_t$ becomes a value less than or equal to 1 when the total transmitting power Ptotal is smaller than the maximum total transmitting power Pmax. The power of each communication channel is thus set to a value smaller than the provisional power in cases in which power conversion rate $C_t$ is a value greater than 1, and the power of each communication channel is set to a value greater than the provisional power when power conversion rate $C_t$ is a value less than 1.

Power conversion rate $C_t$ calculated at conversion rate calculator 401 is notified to transmitting power decision unit 106. Transmitting power decision unit 106 determines the transmitting power Ptx(i) of communication channel i by the case of the following equation (16) (Step C2):

$$Ptx(i) = Pa(i)/C_t \tag{16}$$

In addition, the transmitting power Ptx(j) of communication channel j (j representing any communication channel other than i) is converted to the value obtained by the following equation (17):

$$Ptx(j)=Ptx(j)/C_t \quad (17)$$

By means of these procedures in which the transmitting powers of all communication channels are reduced by the same proportion at times of insufficiency of the base station transmitting power, the total base station transmitting power Ptotal can be controlled so as to be equal to the maximum transmitting power Pmax. On the other hand, when the amount of traffic decreases and the transmitting power of the base station is again sufficient to attain a state indicated by the following equation (18), the total base station transmitting power Ptotal can be controlled so as to be equal to the maximum transmitting power Pmax by increasing the transmitting power of all communication channels by the same proportion.

$$Ptotal<Pmax \quad (18)$$

As a result, the total base station transmitting power Ptotal can always be controlled to a fixed value (maximum transmitting power Pmax) regardless of the amount of traffic.

The operation of this embodiment is next described using, values from an actual example. This explanation is also presented with reference to FIG. 4, which was used in the first embodiment.

An example is described in which the desired transmitting power Pa(i) of communication channel 208 is determined at a time of regularly spaced transmitting power control.

The transmitting powers of each of communication channels 208–211 immediately preceding the transmitting power control of communication channel 208 is assumed as shown in the following Table 5, and the maximum total transmitting power of the communication channels of base station 201 is assumed to be 100.0 mw.

TABLE 5

| channel number k | transmitting power Ptx(k) mw |
| --- | --- |
| 208 | 20.00 |
| 209 | 30.00 |
| 210 | 40.00 |
| 211 | 10.00 |

TABLE 6

| channel number k | transmitting power Ptx(k) mw |
| --- | --- |
| 208 | 11.11 |
| 209 | 33.33 |
| 210 | 44.44 |
| 211 | 11.11 |

If, as a result of calculation by transmitting power decision unit 106, the desired transmitting power that allows communication channel 208 to meet the target quality is 10.0 mw (Step A1), then the communication channel total transmitting power calculated by total transmitting power calculator 103 becomes 90.0 mw (Step A2), and the total transmitting power is less than the maximum total transmitting power 100.0 of base station 201. However, when power conversion rate $C_t$ is calculated by conversion rate calculator 401 (Step C1), a power conversion rate of 0.9 is obtained, and the new transmitting power of each communication channel determined by transmitting power decision unit 106 is as shown in Table 6 (Step C2).

The present embodiment uses power conversion rate $C_t$ in place of power reduction rate $D_t$ used in the above-described first embodiment, thereby not only preventing the transmitting power of the base station from exceeding the maximum total transmitting power Pmax by reducing the transmitting power of each communication channel in cases in which the total base station transmitting power Ptotal exceeds the maximum transmitting power Pmax, but also making the value of the total transmitting power always equal to the maximum transmitting power of the base station by multiplying the set transmitting power by power conversion rate $C_t$ in cases in which the total base station transmitting power Ptotal is smaller than the maximum transmitting power Pmax. The base station transmitting power is thus always constant and the amount of interference from the base station no longer depends on the amount of traffic, thereby simplifying the design of a base station device.

While preferred embodiments of the present invention have been described using specific terms, such description is for illustrative purposes only, and it is to be understood that changes and variations may be made without departing from the spirit or scope of the following claims.

What is claimed is:

1. A method of controlling transmitting power of a base station in a CDMA mobile communication system, comprising the steps of:

calculating desired transmitting power Pa(i) of transmitting power control object channel i (i=1,2, . . . ,n), which is one channel selected for transmitting power control from a plurality of communication channels;

calculating total base station transmitting power Ptotal by adding said desired transmitting power Pa(i) and transmitting powers Ptx(j) that are currently set to communication channels j (j=1,2, . . . ,n, j≠i); and setting as the new transmitting power of said transmitting power control object channel i a value obtained by reducing said desired transmitting power Pa(i) using a power reduction rate $D_t$ and setting as the new transmitting powers of said communication channels j values obtained by reducing each transmitting power Ptx(j) currently set to said communication channels j using said power reduction rate $D_t$ when said total base station transmitting power Ptotal is greater than a predetermined maximum total transmitting power Pmax.

2. A method according to claim 1 wherein said power reduction rate $D_t$ is a value obtained by dividing said total base station transmitting power Ptotal by said maximum total transmitting power Pmax.

3. A method according to claim 1, wherein the desired transmitting power Pa(i) is calculated as a power that meets a preset target speech quality of a forward communication channel based on a speech quality of the communication channel i as judged by a quality judging unit.

4. A method of controlling transmitting power of a base station in a CDMA mobile communication system, comprising the steps of:

selecting at regular intervals one channel from a plurality of communication channels as transmitting power control object channel i (i=1,2, . . . ,n), and, in a transmitting power control process that alters the settings of the transmitting power of each communication channel such that said transmitting power control object channel i meets a prescribed speech quality, storing as previous reduction rate $D_{t-1}$ the power reduction rate of the total transmitting power used in the preceding process;

for communication channels j (j=1,2, . . . ,n, j≠i), making the provisional transmitting power of a communication channel j a value obtained by multiplying transmitting power Ptx(j) currently set to each communication channel as the result of the preceding transmitting power control process by previous reduction rate $D_{t-1}$;

for said transmitting power control object channel i, making the provisional transmitting power of that channel i a value obtained by multiplying desired transmitting power Pa(i) by a prescribed function of said previous reduction rate $D_{t-1}$ if that value that has been multiplied by the prescribed function is equal to or less than a specified maximum transmitting power per channel Pmax−1ch,; and making the provisional transmitting power of that transmitting power control object channel i a value obtained by dividing said maximum transmitting power per channel Pmax−1ch by said prescribed function when a value obtained by multiplying said desired transmitting power Pa(i) by the prescribed function of said previous reduction rate $D_{t-1}$ is greater than the specified maximum transmitting power per channel Pmax−1ch;

adding the provisional transmitting powers of each of said communication channels to calculate the total base station transmitting power Ptotal;

calculating power reduction rate $D_t$, which is the proportion by which said total base station transmitting power Ptotal is reduced, by dividing said total base station transmitting power Ptotal by a specified maximum total transmitting power Pmax;

dividing the provisional transmitting power of each of said communication channel by said power reduction rate $D_t$ and setting the thus-divided transmitting power as the new transmitting power of each of said communication channels when said total base station transmitting power Ptotal is greater than said maximum total transmitting power Pmax; and dividing each of said provisional transmitting powers by previous reduction rate $D_{t-1}$ and setting to each communication channel the thus-divided transmitting power as the new transmitting power of each of said communication channels when said total base station transmitting power Ptotal is equal to or less than said maximum total transmitting power Pmax.

5. A method according to claim 4 wherein said prescribed function of previous reduction rate $D_{t-1}$ is a function by which previous reduction rate $D_{t-1}$ is raised to the α power.

6. A method according to claim 4, wherein making the provisional transmitting power of that channel i comprises:

if Pa(i) multiplied by $(D_{t-1})^\alpha$ is equal to or less than a maximum transmitting power per channel Pmax−1ch, making the provisional transmitting power equal to Pa(i) multiplied by $(D_{t-1})^\alpha$; and if Pa(i) multiplied by $(D_{t-1})^\alpha$ is greater than a maximum transmitting power per channel Pmax−1ch, making the provisional transmitting power equal to Pmax−1ch.

7. A method according claim 6, wherein α comprises a value within the range $0 \leq \alpha \leq 1$.

8. A method of controlling transmitting power of a base station in a CDMA mobile communication system, comprising:

calculating desired transmitting power Pa(i) of transmitting power control object channel i (i=1,2, . . . ,n), which is one channel selected for transmitting power control from a plurality of communication channels, calculating total base station transmitting power Ptotal by adding said desired transmitting power Pa(i) and transmitting powers Ptx(j) currently set to communication channels j (j=1,2, . . . ,n, j≠i), and setting a value obtained by using power conversion rate $C_t$ to convert said desired transmitting power Pa(i) as the new transmitting power of said transmitting power control object channel i, and setting values obtained by using said power conversion rate $C_t$ to convert each transmitting power Ptx(j) currently set to each communication channel j as the new transmitting power of said communication channels j.

9. A method according to claim 8 wherein said power conversion rate $C_t$ is a value obtained by dividing said total base station transmitting power Ptotal by said maximum total transmitting power Pmax.

10. A base station transmitting power control device in a CDMA mobile communication system, comprising:

total transmitting power calculating means for calculating total base station transmitting power Ptotal by adding a desired transmitting power Pa(i) of transmitting power control object channel i (i=1,2, . . . ,n), which is one channel selected for transmitting power control from a plurality of communication channels, and transmitting powers Ptx(j) that are currently set to communication channels j (j=1,2, . . . ,n, j≠i);

comparison means for comparing said total base station transmitting power Ptotal with a predetermined maximum total transmitting power Pmax;

a reduction rate calculating means for calculating a power reduction rate $D_t$ which is a value for reducing said total base station transmitting power Ptotal by a fixed proportion when the comparison result by said comparison means indicates that said total base station transmitting power Ptotal is greater than said maximum total transmitting power Pmax; and a transmitting power decision means for setting a value obtained by using said power reduction rate $D_t$ to reduce said desired transmitting power Pa(i) as the new transmitting power of said transmitting power control object channel i and for setting a value obtained by using said power reduction rate $D_t$ to reduce each transmitting power Ptx(j) currently set to each of said communication channels j as the new transmitting power of said communication channel j if said reduction rate calculating means has calculated said power reduction rate $D_t$.

11. A base station transmitting power control device in a CDMA mobile communication system according to claim 10 wherein said power reduction rate Dt is a value obtained by dividing said total base station transmitting power Ptotal by said maximum total transmitting power Pmax.

12. A device according to claim 10, wherein said transmitting power decision means comprises:

means for setting Pa(i) multiplied by Dt as the new transmitting power if said reduction rate calculating means has calculated said power reduction rate Dt; and means for retaining Pa(i) as the transmitting power if said reduction rate calculating means has not calculated said Dower reduction rate Dt.

13. A base station transmitting power control device in a CDMA mobile communication system, comprising:

a reduction rate storage means for storing as previous reduction rate $D_{t-1}$ the power reduction rate of total transmitting power used in the preceding process in a transmitting power control process that selects one channel as transmitting power control object channel i from a plurality of communication channels at regular intervals and altering the setting of transmitting power of each communication channel such that the transmitting power control object channel i (i=1,2, . . . ,n) meets prescribed speech quality;

a plurality of power multiplying means corresponding to each of said communication channels that, for communication channels j (j=1,2, . . . ,n, j≠i), makes the provisional transmitting power of a communication channel j a value obtained by multiplying transmitting power Ptx(j) currently set to each communication channel as the result of the preceding transmitting power control process by previous reduction rate $D_{t-1}$; and for said transmitting power control object channel i, makes the provisional transmitting power of that channel i a value obtained by multiplying desired transmitting power Pa(i) by a prescribed function of said previous reduction rate $D_{t-1}$ when that value that has been multiplied by the prescribed function is equal to or less than a specified maximum transmitting power per channel Pmax-1ch;

a plurality of first comparison means, each connected to a respective said power multiplying means, each outputting without alteration output from said power multiplying means when the relevant communication channel is not the transmitting power control object channel i; and, when the relevant communication channel is the transmitting power control object channel i, makes the provisional transmitting power of that transmitting power control object channel i a value obtained by dividing said maximum transmitting power per channel Pmax-1ch by said prescribed function of said previous reduction rate $D_{t-1}$ when a value obtained by multiplying said desired transmitting power Pa(i) by said prescribed function of said previous reduction rate $D_{t-1}$ is greater than a specified maximum transmitting power per channel Pmax-1ch;

a total transmitting power calculating means for adding output of each of said first comparison means and taking the result as total base station transmitting power Ptotal;

a second comparison means for comparing said total base station transmitting power Ptotal with a predetermined maximum total transmitting power Pmax;

a reduction rate calculating means for calculating power reduction rate $D_t$, which is a value for reducing by a fixed proportion said total base station transmitting power Ptotal, when the comparison result at said second comparison means indicates that said total base station transmitting power Ptotal is greater than said maximum total transmitting power Pmax; and transmitting power decision means for dividing the provisional transmitting powers of each of said communication channels by said power reduction rate $D_t$ and sets these divided transmitting powers as the new transmitting powers of each of said communication channels when said total base station transmitting power Ptotal is greater than said maximum total transmitting power Pmax; and for dividing each of said provisional transmitting powers by the previous reduction rate $D_{t-1}$ and setting these divided transmitting powers as the new transmitting powers of each of said communication channels when said total base station transmitting power Ptotal is below said maximum total transmitting power Pmax.

14. A base station transmitting power control device in a CDMA mobile communication system, comprising:

total transmitting power calculating means for calculating the total base station transmitting power Ptotal by adding desired transmitting power Pa(i) of a transmitting power control object channel i (i=1,2, . . . ,n), which is one channel selected for transmitting power control from a plurality of communication channels, and transmitting powers Ptx(j) that are currently set to communication channels j (j=1,2, . . . ,n, j≠i);

a conversion rate calculating means for calculating power conversion rate $C_t$, which is a value for converting said total base station transmitting power Ptotal; and transmitting power decision means for setting a value obtained by using said power conversion rate $C_t$ to alter said desired transmitting power Pa(i) as the new transmitting power of said transmitting power control object channel i, and for setting values obtained by using said power conversion rate $C_t$ to alter transmitting powers Ptx(j) that are currently set to each of said communication channels j as the new transmitting powers of said, communication channels j.

15. A base station transmitting power control device in a CDMA mobile communication system according to claim 14 wherein said power conversion rate $C_t$ is a value obtained by dividing said total base station transmitting power Ptotal by said maximum total transmitting power Pmax.

\* \* \* \* \*